Aug. 24, 1943.  W. A. SHAW ET AL  2,327,464
UNION COUPLING
Original Filed Dec. 18, 1939   2 Sheets-Sheet 1

Inventors
William A. Shaw
Arthur C. A. Hodge
By Lyon & Lyon
Attorneys

Aug. 24, 1943.  W. A. SHAW ET AL  2,327,464
UNION COUPLING
Original Filed Dec. 18, 1939  2 Sheets-Sheet 2

Inventors
William A. Shaw
Arthur O. A. Hodge

By Lyon & Lyon
Attorneys

Patented Aug. 24, 1943

2,327,464

UNITED STATES PATENT OFFICE 2,327,464

UNION COUPLING

William A. Shaw, Los Angeles, and Arthur O. A. Hodge, Hermosa Beach, Calif., assignors to The National Supply Company, Pittsburgh, Pa., a corporation of Pennsylvania Original application December 18, 1939, Serial No. 309,710. Divided and this application March 4, 1941, Serial No. 381,754

7 Claims. (Cl. 285—120)

This invention relates to rotary swivels and more particularly to an improvement in the hydraulic rotary swivel as used in connection with rotary well drilling apparatus.

An hydraulic rotary swivel as used in connection with rotary drilling apparatus is required to rotatably support the weight of the rotating drill string and such swivel must also provide means whereby the drilling fluid may be introduced into the drill string. In the conventional hydraulic rotary drilling construction there is employed a renewable element commonly referred to in the art as a "washpipe." The washpipe is inserted in the fluid conducting system to transmit the drilling fluid from the stationary supply, usually a gooseneck, to the rotating drill string or connector therefor carried by the swivel.

The washpipe in such structure is packed commonly with relation to the rotating element of the swivel and also with relation to the stationary gooseneck.

The drilling fluid utilized is very abrasive in character and is carried under high pressure so that frequent replacements of the packing and the washpipes are necessary. In the conventional construction of swivel, it is essential for each replacement in the washpipe to dismantle the upper portion of the swivel. The gooseneck is removed and before reassembly can be established, it is commonly necessary to remove the hose connections in order to enable proper alignment to be attained. The replacement of a washpipe in a conventional type swivel is thus a difficult and time-consuming operation.

In drilling operations such washpipe replacement ties up the entire drilling equipment and stops all operations. It is therefore the principal object of our invention to provide a hydraulic rotary swivel in which there is a washpipe so constructed and mounted as to enable its connection and easy replacement without necessitating the dismantling of the swivel, gooseneck or hose connections thereof.

Another object of our invention is to provide means for detachably securing the washpipe to one of the fluid conducting members of such hydraulic rotary swivel.

Another object of this invention is to provide a washpipe construction having means for facilitating its removal from the member to which it is secured.

Another object is to provide such a washpipe which is adapted to be secured to the rotating member to turn concentrically therewith, and having flange means for use in detaching it from said member.

Other objects and advantages of this invention it is believed will be apparent from the following detailed description of a preferred embodiment thereof as illustrated in the accompanying drawings.

Figures 1, 2, 6:
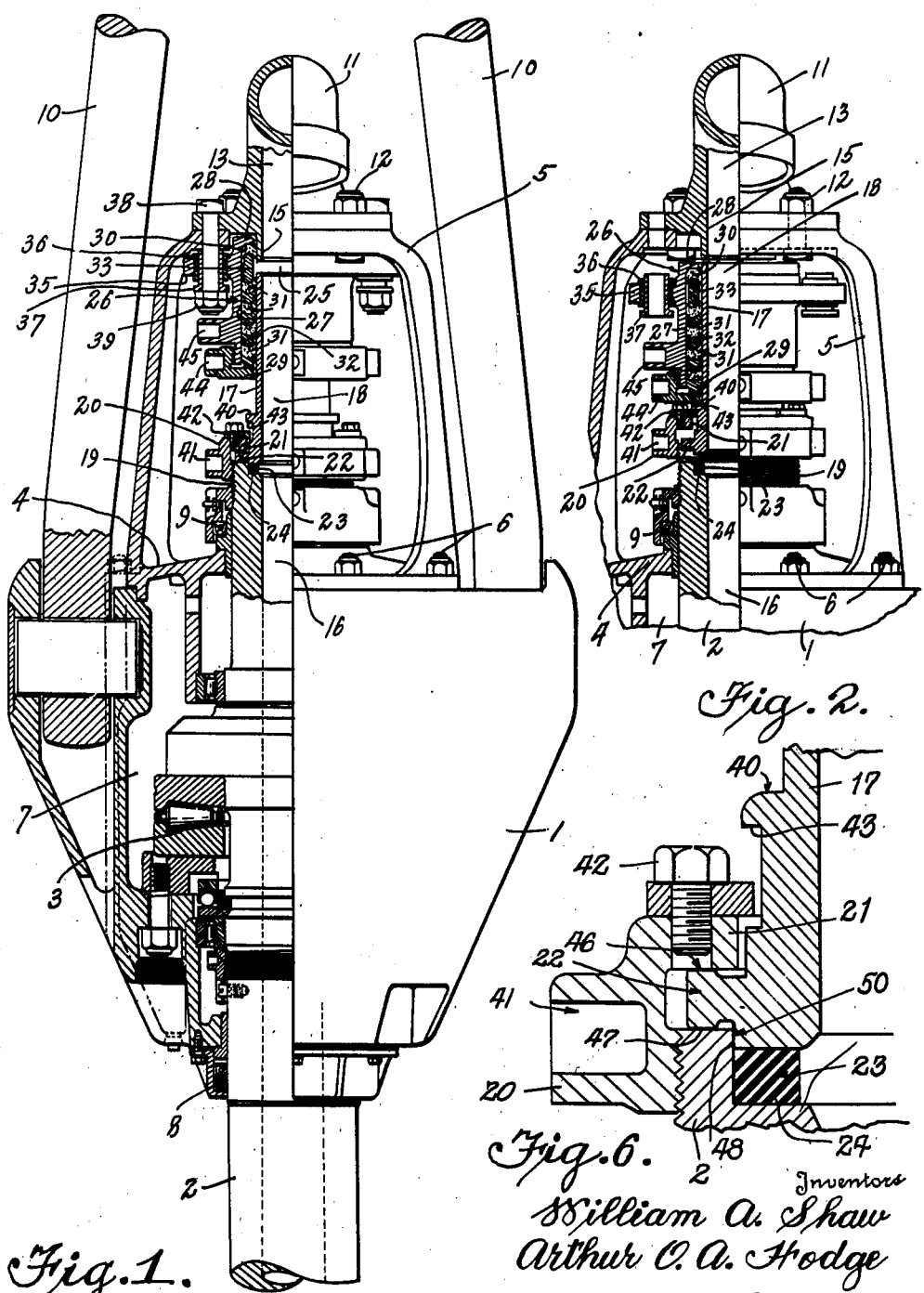
Figure 1 is an elevation partly in vertical section of a hydraulic rotary swivel incorporating the preferred embodiment of our invention.
Figure 2 is a fragmental view partly in vertical section illustrating the washpipe and packing in collapsed position preparatory to removal thereof.
Figure 6 shows a portion of Figure 3 on a large scale.
Figure 3:
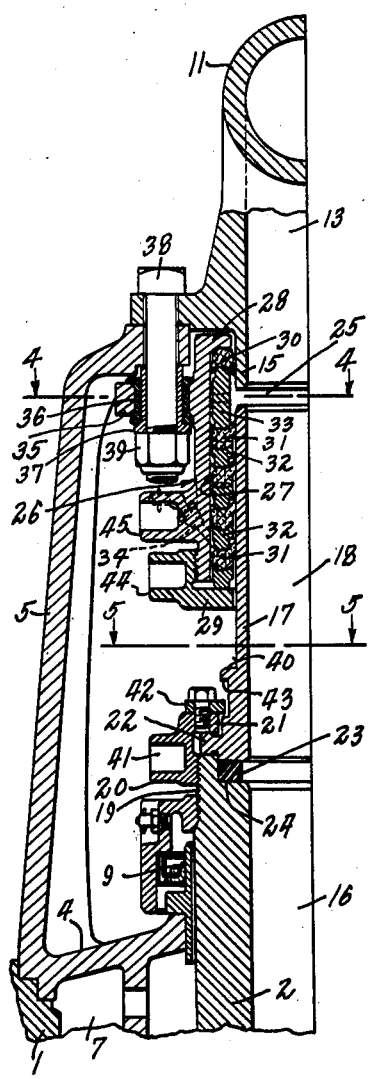
Figure 3 is an enlarged partial sectional elevation of the washpipe construction and assembly embodying our invention and illustrating the same on an enlarged scale.
Figure 4:
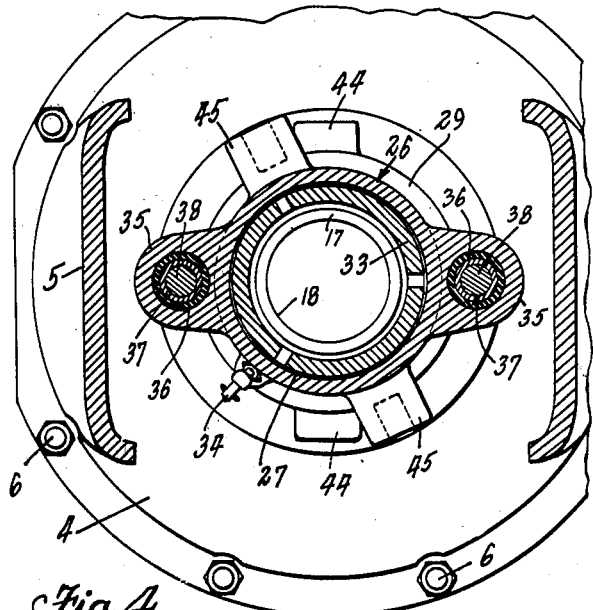
Figure 4 is a sectional end view taken substantially on the line 4—4 of Figure 3.
Figure 5:
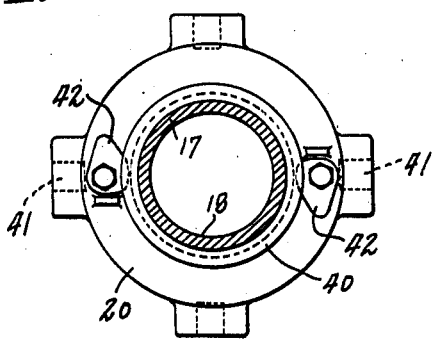
Figure 5 is a sectional end view taken substantially on the line 5—5 of Figure 3.

In the preferred embodiment of our invention as illustrated in the accompanying drawings, the hydraulic rotary swivel includes a body 1 which rotatably supports a spindle or rotating member 2. As is customary in such constructions, the rotating element 2 is suitably coupled with the drill string, not shown.

The spindle 2 is rotatably supported in the body 1 upon a thrust bearing 3. The upper end of the spindle 2 projects through a cover 4. The cover 4 forms a part of the supporting member 5. The supporting member 5 is secured to the body 1 by means of studs 6 and cooperates with the body 1 to form an enclosure 7 for the bearing 3. Sealing means 8 and 9 are customarily provided in such structures to prevent escape of lubricant as well as to exclude foreign matter from within the chamber or enclosure 7. A bail 10 is ordinarily provided for suspending the body 1.

At the upper end of the support 5 a gooseneck 11 is supported and held in position by means of bolts 12. The gooseneck 11 provides a fluid passageway 13, the intake end of which is connected to the customary hose (not shown) and the discharge end is formed as a downwardly projecting tube 15. The tubular portion 15 is positioned in alignment with the fluid passage 16 formed through the rotary spindle 2.

Interposed between the rotary spindle 2 and the tubular portion 15 of the gooseneck 11 is a washpipe 17 which has a central fluid passage 18 adapted to connect the fluid passages 13 and 16.

The washpipe 17 is of a length less than the distance between the upper end of the spindle 2 and the lower end of the tubular portion 15 of the gooseneck 11, such distance being indicated by the letter "D" in Figure 2. It will be obvious that the washpipe 17 may be fixed with respect to either stationary gooseneck 11 or, as illustrated in the preferred construction, may be fixed to the spindle 2 so as to rotate therewith.

In the construction as illustrated the washpipe 17 is removably secured to the upper end of the spindle 2 as follows: The upper end of the spindle 2 is threaded as indicated at 19 to receive a flange nut 20. The flange 21 of the flange nut 20 is adapted to engage the annular rim 22 of the washpipe 17 and to clamp the washpipe 17 against the upper end of the spindle 2. A rubber packing ring 23 is interposed between the end of the washpipe 17 and a shoulder 24 formed within the spindle 2 to provide a leak-proof joint at this point. The annular rim 22 on the washpipe 17 is provided with an annular upwardly facing abutment 46 and an annular downwardly facing shoulder 47 positioned in parallel horizontal planes. The flange 21 of the nut 20 engages the abutment 46 and the shoulder 47 rests on the abutment 46 and the shoulder 47 rests on the upper end of the rotary spindle 2. A cylindrical alignment surface 48 on the washpipe 17 which is formed co-axially of the cylindrical wear surface 49 is adapted to be received within a counterbore 50 provided in the upper end of the rotary spindle 2 to maintain alignment of the washpipe 17 and spindle 2.

When the washpipe 17 is thus secured in operative position upon the spindle 2, an annular clearance space 25 exists between the upper end of the rotating washpipe 17 and the lower end of the stationary tube 15. Encircling this annular clearance space is a packing container or housing 26.

The packing container 26 has a central cylindrical bore 27. The container 26 is formed at its upper end with an annular flange 28 which defines the upper end of the bore 27. A detachable end flange 29 defines the lower end of the bore 27. The end flanges 28 and 29 do not contact the outer walls of the tube portion 15 or the washpipe 17 but on the contrary, are formed to provide substantial clearance therewith.

Packing means are provided for packing the packing carrier or housing 26 to the tubular portion 15 of the gooseneck 11 and to the rotating washpipe 17. There is thus provided a stationary packing, or a packing required between two stationary elements and the packing required between the stationary carrier 26 and the rotating washpipe 17. The stationary packing between the carrier 26 and the tubular portion 15 is composed of the packing ring 30. The rotating packing means consists of a plurality of spaced packing rings 31 interposed between packing carrier 26 and the rotating washpipe 17. The packing may be of any suitable or desirable construction and is herein illustrated as being composed of a series of packing rings 31 held spaced by means of suitable spacing rings 32.

An annular spacer 33 is interposed between the packing ring 30 and the packing assembly of the rotating packing connection. A grease fitting 34 is provided for introducing lubricant under pressure into the packing recess. The packing carrier or housing 26 is provided with a pair of outwardly extending carrier arms 35 for its support. Each of the carrier arms 35 is adapted to receive a rubber bushing 36. Positioned within each rubber bushing 36 is a metallic sleeve 37. Bolts 38 are passed through the metallic sleeves 37 and through the supporting means 5. Nuts 39 are threaded to the bolts 38 to support the packing carrier or housing 26. The bolts 38 also pass through the flange of the gooseneck 11 to aid in maintaining the same upon the support 5.

The supporting means 5 above the cover portion 4 does not completely surround the washpipe 17 but leaves openings on both sides. The washpipe 17 and packing assembly may therefore be removed through either of these lateral openings without disconnecting the gooseneck 11 or the hose connection. When it is desired to effect this operation, the nuts 39 are removed from the bolts 38, permitting the packing container 26 to be lowered on the washpipe 17 until the lower flange 29 strikes the shoulder 40. The nut 20 is then unthreaded from the rotary spindle 2. A bar (not shown) may be inserted into the opening 41 if required, in order to unthread the nut 20. Should the washpipe 17 exhibit a tendency to stick to the spindle 2, the lugs 42 are turned until a portion of them extend under the abutment 43 of the washpipe 17. Further unscrewing of the nut 20 will then cause the lugs 42 to engage the abutment 43 and to thereby jack the washpipe 17 away from the spindle 2. The parts are then moved to the position shown in Figure 2 and may be removed laterally through one of the openings in the support 5. Bosses 44 and 45 are provided on the nut 29 and housing 26 to facilitate unscrewing of the nut 29.

When the washpipe 17 and packing container 26 have been removed from the swivel, the pivoted lugs 42 are turned until they clear the abutment 43. The washpipe 17 and nut 20 may then be separated.

This invention is a division of our co-pending application, Serial No. 309,710, filed December 18, 1939, now United States Patent No. 2,237,715, issued April 8, 1941.

Having fully described our invention, it is to be understood that we do not wish to be limited to the details herein set forth, but our invention is of the full scope of the appended claims.

We claim:

1. In a connection joint for tubular elements, a washpipe having an external cylindrical wear surface prepared for rotary contact with a packing means, attaching means positioned at the lower end of the washpipe for securing it in operative position with respect to the other tubular element, said attaching means including an upwardly facing radially extending abutment and a downwardly facing radially extending shoulder axially spaced from the abutment, a cylindrical alignment surface disposed coaxially of said cylindrical wear surface, said alignment surface being adapted to cooperate directly with said other tubular element to maintain alignment, and a downwardly facing radially extending abutment for use in disconnecting the washpipe from operative position.

2. In a connection joint for tubular elements, a washpipe portion having an external cylindrical wear surface, attaching means positioned at the lower end of the washpipe for securing it in operative position with respect to the other tubular element, said attaching means including an upwardly facing abutment and a downwardly facing shoulder positioned in parallel horizontal planes, a cylindrical alignment surface below the abutment disposed coaxially of said cylindrical wear surface and adapted to cooperate directly with said other tubular element to maintain alignment, and a downwardly facing radially extending abutment for use in disconnecting the washpipe from operative position.

3. In a connection joint for tubular elements, a washpipe provided with an external cylindrical wear surface, attaching means positioned at the lower end of the washpipe for securing it in operative position with respect to the other tubular element, said attaching means including an upwardly facing abutment and a downwardly facing shoulder below said abutment, said abutment and shoulder being positioned in parallel horizontal planes, a cylindrical alignment surface disposed co-axially of said cylindrical wear surface and positioned below said abutment, said alignment surface being adapted to cooperate directly with said other tubular element to maintain alignment, and a downwardly facing radially extending abutment for use in disconnecting the washpipe from operative position.

4. In a connection joint, the combination of a pair of tubular elements, means for insuring co-axial alignment of said tubular elements including a cylindrical extension on the first element adapted to be received within a cylindrical recess on the second element, a distortable sealing ring disposed between said tubular elements adjacent said cylindrical extension, said means also including a pair of annular radial shoulders on said elements adapted to meet in mutual engagement to limit distortion of the sealing ring, a clamping nut threadedly connected to the second tubular element and adapted to contact a portion of the first tubular element to maintain said radial shoulders in contact, a downwardly facing radially extending abutment on the first tubular element above said radial shoulders, and retractable means on said nut adapted to project under said abutment, whereby unthreading of said nut brings said retractable means into contact with said abutment and thereby separates the tubular elements in an axial direction.

5. In a connection joint for tubular elements, the combination of a cylindrical extension on one element adapted to be received within a cylindrical recess on the other element, a distortable sealing ring disposed between said tubular elements adjacent said cylindrical extension, a pair of annular radial shoulders on said elements adapted to meet in mutual engagement to limit distortion of the sealing ring, a clamping nut threaded on one of the tubular elements and adapted to maintain the radial shoulders in contact, a radially extending abutment on the other tubular element, a plurality of movable parts on said nut adapted when in operative position to engage said abutment whereby unthreading of the nut may be utilized to separate said tubular elements, said parts being movable relative to said nut to an inoperative position whereby initial assembly of the nut and tubular elements may be effected.

6. In a coupling device of the type described, a replaceable wear element adapted to be secured to one end of a rotary spindle in co-axial alignment therewith, said element having an upwardly facing abutment and a downwardly facing shoulder positioned in parallel horizontal planes, a radial shoulder on said spindle, a nut threaded on said spindle and adapted to contact said abutment to maintain the shoulders in engagement, a downwardly facing radially extending abutment on the wear element, and retractable means on the nut adapted to engage under the downwardly facing abutment, whereby unthreading of the nut may serve to disconnect the wear element from operative position relative to the rotary spindle.

7. In a connection joint, a tube having an external cylindrical wear surface prepared for rotary contact with a packing means, attaching means near the lower end of the tube for securing it coaxially with respect to an adjacent tubular element, said attaching means including an upwardly facing radially extending abutment and a downwardly facing radially extending shoulder axially spaced below the abutment, a cylindrical projection on the lower end of the tube, said shoulder being positioned at one end of the cylindrical projection, said cylindrical projection being disposed coaxially of said cylindrical wear surface and adapted to cooperate directly with the adjacent tubular element to maintain alignment, and a downwardly facing radially extending abutment for use in disconnecting the tube from the tubular element.

WILLIAM A. SHAW.
ARTHUR O. A. HODGE.